US011306660B2

(12) United States Patent
Morenko

(10) Patent No.: US 11,306,660 B2
(45) Date of Patent: Apr. 19, 2022

(54) TRANSFER TUBE MANIFOLD WITH INTEGRATED PLUGS

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1093 days.

(21) Appl. No.: 15/492,255

(22) Filed: Apr. 20, 2017

(65) Prior Publication Data

US 2018/0306117 A1 Oct. 25, 2018

(51) Int. Cl.
*F02C 7/22* (2006.01)
*F23R 3/28* (2006.01)

(52) U.S. Cl.
CPC ............ *F02C 7/222* (2013.01); *F23R 3/283* (2013.01); *F05D 2230/60* (2013.01); *F23R 2900/00017* (2013.01)

(58) Field of Classification Search
CPC .. F02C 7/222; F02C 7/22; F02C 7/228; F23R 3/283; F23R 2900/00017; F05D 2230/60
See application file for complete search history.

(56) References Cited

U.S. PATENT DOCUMENTS

| | | | |
|---|---|---|---|
| 2,690,648 A | 10/1954 | Pearce et al. | |
| 3,087,301 A * | 4/1963 | Mulready | F02C 7/222 60/762 |
| 4,028,888 A * | 6/1977 | Pilarczyk | F02C 7/222 60/798 |
| 4,708,371 A | 11/1987 | Elsworth et al. | |
| 5,020,329 A | 6/1991 | Ekstedt | |
| 5,168,698 A | 12/1992 | Peterson et al. | |
| 5,263,314 A | 11/1993 | Anderson | |
| 5,289,685 A * | 3/1994 | Hoffa | F02C 7/222 60/739 |
| 5,653,109 A | 8/1997 | Overton et al. | |
| 6,038,852 A | 3/2000 | Celi | |
| 6,339,924 B1 | 1/2002 | Hoyer et al. | |
| 6,487,860 B2 | 12/2002 | Mayersky et al. | |
| 7,992,390 B2 | 8/2011 | Patel et al. | |
| 9,133,770 B2 | 9/2015 | Henkle et al. | |
| 9,453,485 B2 | 9/2016 | Masti | |
| 2004/0266274 A1* | 12/2004 | Naudet | F02C 7/222 439/719 |
| 2006/0288707 A1 | 12/2006 | Weaver | |
| 2007/0006590 A1 | 1/2007 | Muldoon | |
| 2007/0015395 A1* | 1/2007 | Lefebvre | F02K 1/04 439/404 |
| 2007/0113558 A1 | 5/2007 | Brown | |

(Continued)

FOREIGN PATENT DOCUMENTS

GB 2461503 1/2010

*Primary Examiner* — Ehud Gartenberg
*Assistant Examiner* — Henry Ng
(74) *Attorney, Agent, or Firm* — Norton Rose Fulbright Canada LLP

(57) ABSTRACT

A gas turbine engine fuel supply system has a plurality of fuel nozzles fluidly connected to a source of fuel by transfer tubes extending between the fuel nozzles. At least one plug extends between first and second adjacent nozzles of the set of fuel nozzles. The plug has a first end plugging a port on the first adjacent nozzle and a second end plugging another port on the second adjacent nozzle.

8 Claims, 4 Drawing Sheets

(56) References Cited

U.S. PATENT DOCUMENTS

| | | | |
|---|---|---|---|
| 2007/0234724 A1* | 10/2007 | Prociw | F02C 7/222 |
| | | | 60/740 |
| 2010/0146928 A1* | 6/2010 | Morenko | F02C 7/222 |
| | | | 60/39.094 |
| 2012/0145273 A1* | 6/2012 | Pelletier | F02C 7/222 |
| | | | 138/111 |
| 2014/0174088 A1* | 6/2014 | Ruberte Sanchez | F02K 3/10 |
| | | | 60/722 |
| 2015/0176496 A1 | 6/2015 | Zordan | |
| 2015/0361897 A1 | 12/2015 | Steele | |

* cited by examiner

TRANSFER TUBE MANIFOLD WITH INTEGRATED PLUGS

TECHNICAL FIELD

The application relates generally to gas turbine engines and, more particularly, to fuel supply systems for such engines.

BACKGROUND

A fuel manifold of a gas turbine engine distributes fuel from a fuel source to an array of fuel nozzles configured to inject fuel into the engine combustor. Due to the high temperature environment prior art manifolds of various types have disadvantages. For instance, flexible manifolds have a partial ring configuration which requires the use of a different type of fuel nozzles at the opposed terminal ends of the manifold. The need for different types of fuel nozzles adds complexity and cost.

There is, thus, a need for a new fuel manifold arrangement.

SUMMARY

In accordance with a general aspect, there is provided a fuel supply system for a gas turbine engine, comprising: a plurality of fuel nozzles fluidly connected to a source of fuel and to each other by a plurality of fuel transfer tubes extending between adjacent said fuel nozzles; and at least one plug extending between first and second adjacent said fuel nozzles, the at least one plug having a first end plugging a port on the first adjacent nozzle and a second end plugging a port on the second adjacent nozzle.

In accordance with another general aspect, there is also provided a gas turbine engine having a fuel supply system, the system comprising: an array of circumferentially spaced-apart fuel nozzles; and a manifold ring for distributing fuel from a source of fuel to the array of circumferentially spaced-apart nozzles, the manifold ring including manifold segments between adjacent fuel nozzles of the array of circumferentially spaced-apart fuel nozzles, wherein the manifold segments comprises a dummy manifold segment comprising a plug extending between first and second adjacent fuel nozzles of the array of circumferentially spaced-apart fuel nozzles, the plug locally fluidly interrupting the manifold ring between the first and second adjacent nozzles.

In accordance with a still further general aspect, there is provided a method of assembling a fuel manifold ring around a combustor of a gas turbine engine, the method comprising: fluidly interconnecting an array of fuel nozzles to a source of fuel with manifold segments extending between pairs of adjacent fuel nozzles, and locally interrupting the fuel manifold ring between first and second adjacent fuel nozzles of one of the pairs of adjacent fuel nozzles, wherein locally interrupting the fuel manifold comprises plugging the first and second adjacent fuel nozzles.

BRIEF DESCRIPTION OF THE DRAWINGS

Reference is now made to the accompanying figures in which.

DETAILED DESCRIPTION

Figure 1:
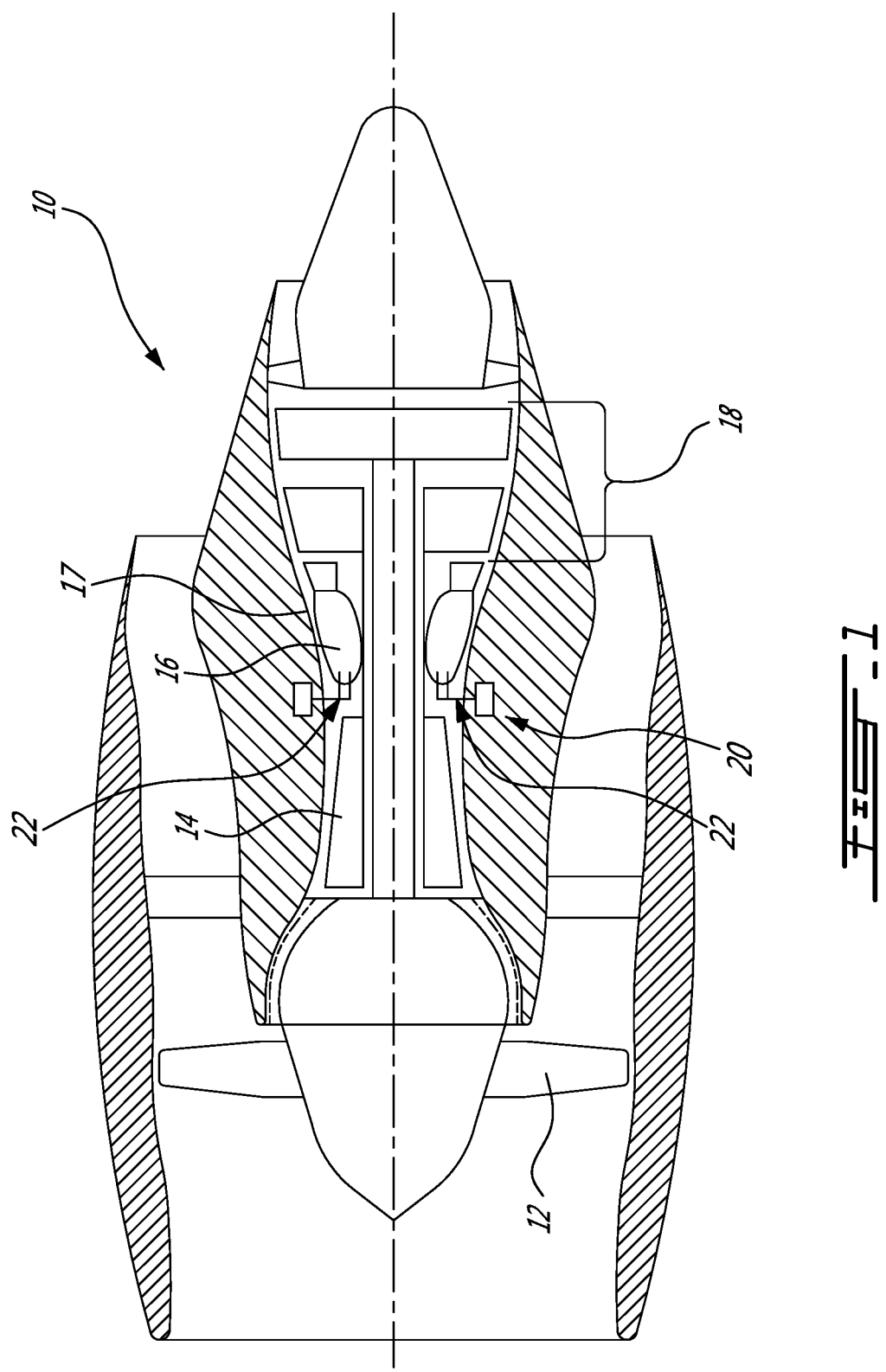
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
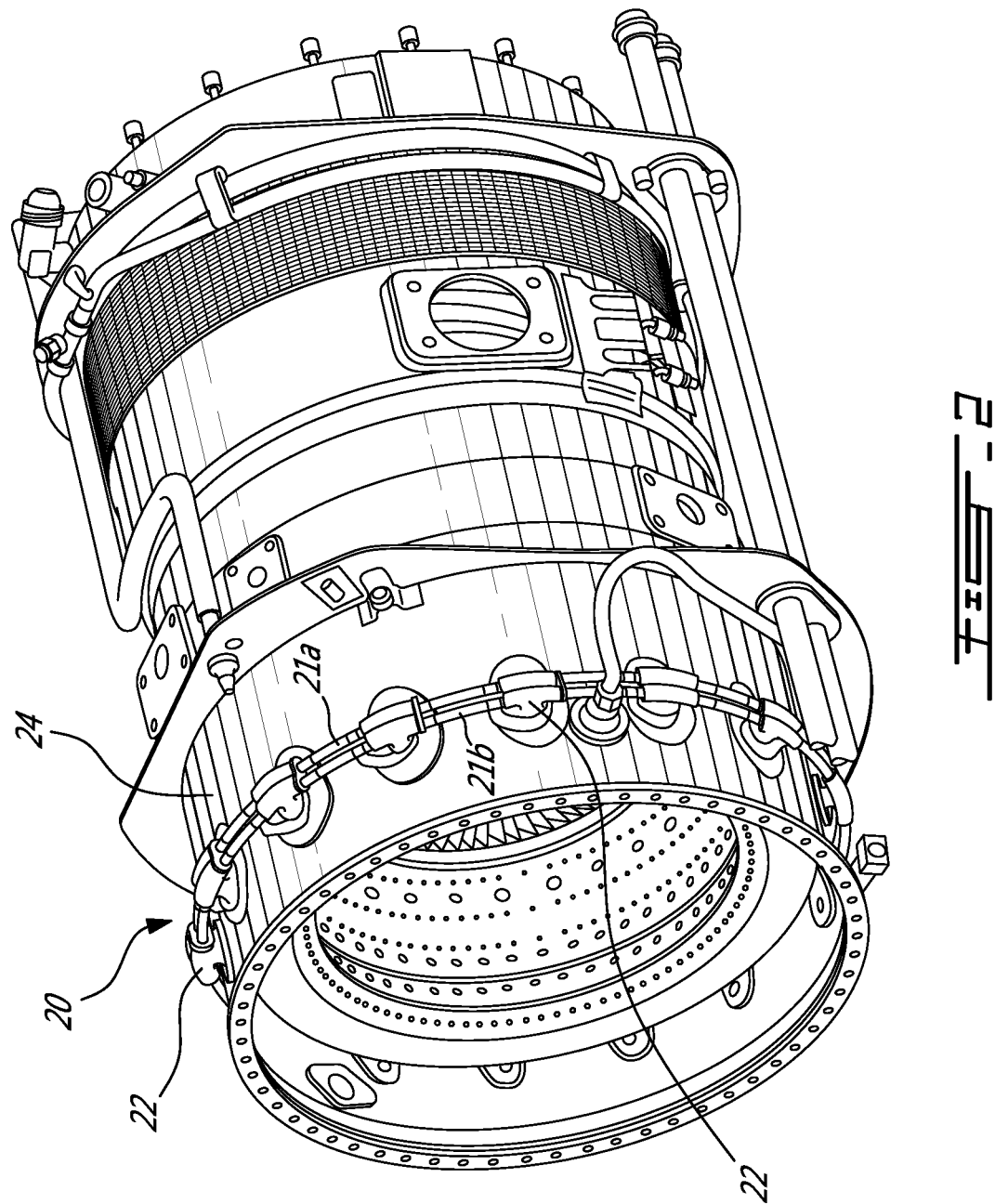
FIG. 2 is an isometric view of a gas generator case section of the engine.
Figure 4:
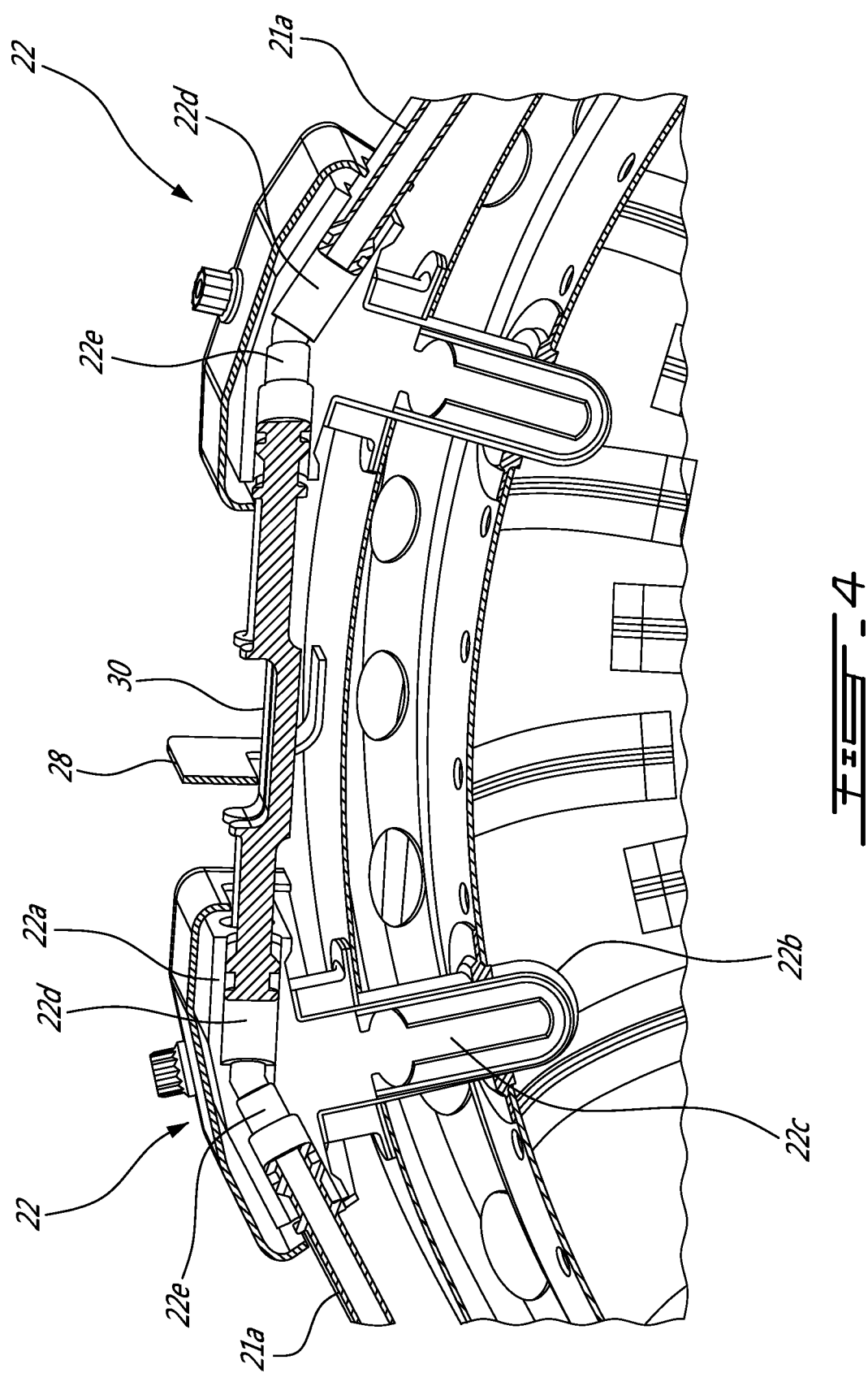
FIG. 4 is a cross-section view of the dummy manifold segment and of the mistake proofing bracket shown in FIG. 3.

The combustor 16 has a fuel supply system generally including a fuel nozzle assembly and a manifold 20 fluidly connecting the nozzle assembly to a common source of fuel (not shown). According to the exemplary embodiment shown in FIG. 2, the fuel nozzle assembly is provided in the form of an array of circumferentially spaced-apart fuel nozzles 22 mounted to a gas generator case 24 surrounding the combustor 16. As shown in FIG. 4, each nozzle 22 typically has an inlet head or head fitting 22a protruding outwardly from the gas generator case 24, a nozzle tip 22b for injecting the primary and secondary fuel into the combustion chamber of the combustor 16, and a nozzle stem 22c connecting the inlet head 22a to the tip 22b and providing fuel communication therebetween. The inlet head 22a of each nozzle 22 has a pair of inlet ports 22d (one for the primary fuel and one for the secondary fuel) on a first side thereof and a pair of outlet ports 22e (again one for the primary fuel and one for the secondary fuel) on a second opposed side thereof.

Still according to the illustrated example, the manifold 20 is provided in the form of a manifold ring connected to a fuel supply line (not shown). The manifold ring typically comprises first and second halves extending in opposite directions from the fuel supply line. Each half includes manifold segments interconnecting adjacent fuel nozzles 22. Each manifold segment but one (a dummy manifold segment as will be seen hereinafter) comprises side-by-side primary and secondary fuel transfer tubes 21a, 21b extending between adjacent nozzles 22. The transfer tubes 21a, 21b are configured to be operatively connected to the inlet and outlet ports 22d, 22e of the fuel nozzles 22. It is understood that the primary and secondary fuel transfer tubes 21a, 21b could adopt various configurations. For instance, the primary and secondary fuel transfer tubes 21a, 21b between each pair of adjacent nozzles 22 could be concentric. Also, depending on the intended application, only one transfer tube could extend between two adjacent nozzles 22.

Transfer tubes manifolds generally define a 360 degree fluidly uninterrupted/continued loop. Although such a full ring configuration has a number of advantages (e.g. fuel nozzle commonality, mistake proofing etc.), some manifold installations require a different architecture. For example, 360 degree manifold loop assumes a fuel stagnation zone on the "top" of the manifold, which is not always desirable. Also, when a transfer tube manifold replaces a flexible manifold (which does not have a 360 degree configuration), the transfer tube manifold loop has to be also "broken" to provide the required flexible manifold architecture. This is typically achieved by proving two different nozzles, which have provisions to connect the transfer tubes only to one side of the nozzles. These "uncommon" nozzles substantially increase the total cost of the fuel supply system. Indeed, it requires the purchase of two different models of fuel nozzles instead of a single one. In addition, mistake proof features may be required to ensure that the different nozzles are all installed at the right locations. This increases the cost and complexity of the system even more.

Instead of using two "special" fuel nozzles (nozzles with transfer tube connectivity on only one side thereof) to break the fluid continuity of the manifold ring, it is herein suggested to integrate a dummy manifold segment between two of the common fuel nozzles. In this way, only one type of fuel nozzles (i.e. fuel nozzles with transfer tube connectivity on first and second opposed sides) can be used all around the fuel manifold and the continuity of the manifold ring can be interrupted between any desired pair of adjacent fuel nozzles.

Figure 3:
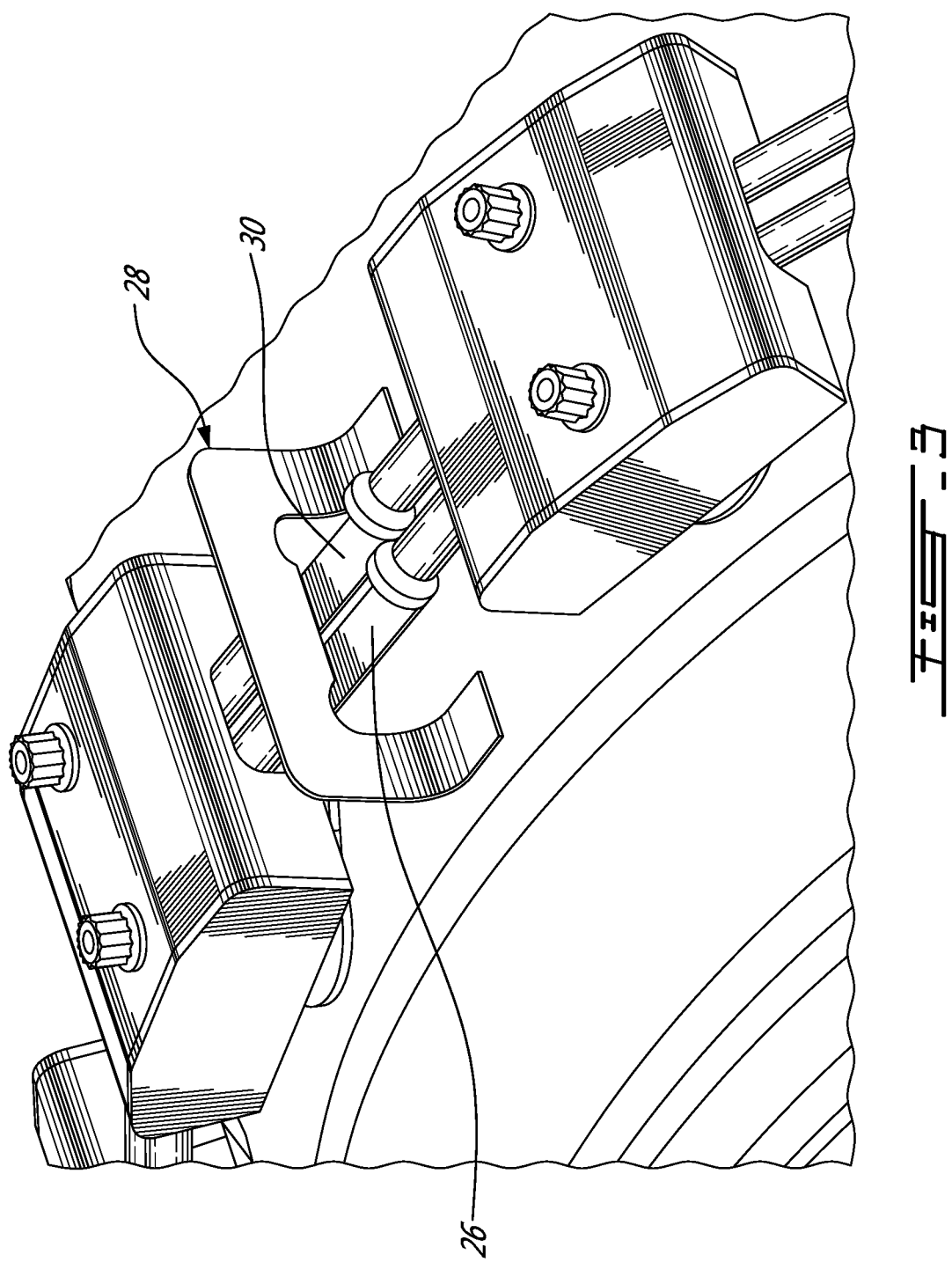
FIG. 3 is an isometric view illustrating a dummy manifold segment and a mistake proofing bracket between two adjacent fuel nozzles.

Now referring concurrently to FIGS. 3 and 4, it can be appreciated that the dummy manifold segment acts as a plug for plugging the ports 22d, 22e on the facing sides of two adjacent fuel nozzles 22. According to the illustrated embodiment, the dummy manifold segment comprises two solid dummy transfer tubes 26 respectively configured to locally plug the primary and second fuel ports 22d, 22e of the adjacent fuel nozzles 22. Each solid dummy transfer tube or plug extends between the adjacent nozzles 22 and has a first end plugged into a port of a first one of the nozzle 22 and a second end plugged into a corresponding port of the second one of the adjacent nozzles 22.

A mistake proofing bracket 28 can be provided on the case generator case 24 at the circumferential location where the manifold ring is to be discontinued (e.g. a top of case 24). The bracket 28 can be provided in the form of a C-shaped bracket brazed or otherwise suitably secured to the case 24. The mistake proofing bracket 28 is configured to prevent inadvertent installation of transfer tubes 21a, 21b between fuel nozzles 22 bordering the location where the continuity of the manifold loop is to be interrupted. The mistake proofing bracket 28 forms a physical obstacle between the pair of adjacent nozzles 22. The solid dummy transfer tubes 26 are shaped to circumvent the physical obstacle formed by the bracket 28. According to the illustrated embodiment, the mistake proofing bracket 28 defines an opening through which the solid dummy transfer tubes 26 are adapted to extend. Still according to the illustrated embodiment, an elongated cut-out 30 is defined in an intermediate portion of each of the solid dummy transfer tubes 26 to provide the required clearance to install the solid dummy tubes underneath the bracket 28.

It can be appreciated that the plugs (e.g. the dummy transfer tubes) allows to "break" the fluid continuity of the transfer tube manifold in order to provide a flexible manifold configuration while allowing maintaining the fuel nozzle commonality. The possibility of using a single type of fuel nozzle in a flexible manifold configuration contributes to reduce the costs and simplify the assembly procedures.

The above description is meant to be exemplary only, and one skilled in the art will recognize that changes may be made to the embodiments described without departing from the scope of the invention claimed. Modifications which fall within the scope of the claimed invention will be apparent to those skilled in the art, in light of a review of this disclosure, and such modifications are intended to fall within the appended claims.

The invention claimed is:

1. A gas turbine engine having a fuel supply system comprising: an array of circumferentially spaced-apart fuel nozzles; and a manifold ring for distributing fuel from a source of fuel to the array of circumferentially spaced-apart fuel nozzles, the manifold ring including manifold segments between adjacent fuel nozzles of the array of circumferentially spaced-apart fuel nozzles, wherein the manifold segments include a dummy manifold segment comprising a plug extending between a first adjacent fuel nozzle and a second adjacent fuel nozzle of the array of circumferentially spaced-apart fuel nozzles, the plug locally fluidly interrupting the manifold ring between the first adjacent fuel nozzle and the second adjacent fuel nozzle, wherein the first adjacent fuel nozzle and the second adjacent fuel nozzle each have an inlet head having an inlet port on a first side thereof and an outlet port on a second opposed side thereof, the plug having a first solid end having no internal fuel passage and extending into and closing the inlet port of the first adjacent fuel nozzle and a second solid end having no internal fuel passage and extending into and closing the outlet port of the second adjacent fuel nozzle, wherein the first solid end and the second solid end of the plug have the same outer shape and size of respective ends of said manifold segments; wherein the plug has an intermediate solid section having no internal fuel passage between the first solid end and the second solid end, the intermediate solid section having a cross-sectional shape different from that of the first solid end and the second solid end and configured to cooperate with a mistake proofing bracket disposed between the first adjacent fuel nozzle and the second adjacent fuel nozzle, wherein the mistake proofing bracket is configured to prevent inadvertent installation of transfer tubes between the first adjacent fuel nozzle and the second adjacent fuel nozzle in place of the plug, and wherein the mistake proofing bracket is axially trapped between opposed ends of an elongated cut-out extending along the intermediate solid section of the plug.

2. The gas turbine engine defined in claim 1, wherein the plug comprises at least one solid dummy transfer tube.

3. The gas turbine engine defined in claim 1, wherein the inlet head of the first adjacent fuel nozzle and the second adjacent fuel nozzle is identical to that of the other fuel nozzles of the array of circumferentially spaced-apart fuel nozzles.

4. The gas turbine engine defined in claim 1, wherein the mistake proofing bracket forms a physical obstacle between the first adjacent fuel nozzle and the second adjacent fuel nozzle, and wherein the intermediate solid section of the plug is shaped to circumvent said physical obstacle.

5. The gas turbine engine defined in claim 1, wherein the mistake proofing bracket defines an opening, and wherein the intermediate solid section of the plug extends through said opening.

6. A method of assembling a fuel manifold ring around a combustor of a gas turbine engine, the method comprising: fluidly interconnecting an array of fuel nozzles to a source of fuel with manifold segments extending between pairs of adjacent fuel nozzles of the array of fuel nozzles, and locally interrupting the fuel manifold ring between a first adjacent fuel nozzle and a second adjacent fuel nozzle of one of the pairs of adjacent fuel nozzles, wherein locally interrupting the fuel manifold ring comprises plugging the first adjacent fuel nozzle and the second adjacent fuel nozzle, wherein plugging comprises inserting solid dummy transfer tubes having no internal fuel passages into ports defined in an inlet fitting of the first adjacent fuel nozzle and the second adjacent fuel nozzle, wherein the solid dummy transfer tubes each have a first solid end and a second solid end having a same outer shape and size of respective ends of said manifold segments; and wherein the solid dummy transfer tubes each have an intermediate solid section between the first solid end and the second solid end, the intermediate solid section having no internal fuel passage and having a shape different from that of the first solid end and the second solid end and configured to cooperate with a mistake proofing bracket disposed between the first adjacent fuel nozzle and the second adjacent fuel nozzle, the mistake proofing bracket axially trapped between opposed ends of an elongated cut-out extending along the intermediate solid section of each of the solid dummy transfer tubes.

7. The method as defined in claim 6, wherein the manifold segments include fuel transfer tubes, and wherein the method further comprises installing the mistake proofing bracket on the combustor between the first adjacent fuel nozzle and the second adjacent fuel nozzle, the mistake proofing bracket allowing the installation of the solid dummy transfer tubes but preventing installation of the fuel transfer tubes between the first adjacent fuel nozzle and the second adjacent fuel nozzle.

8. The method as defined in claim 7, wherein plugging comprises passing the solid dummy transfer tubes through an opening defined by the mistake proofing bracket.

* * * * *